United States Patent
Sahai et al.

(10) Patent No.: US 7,051,094 B1
(45) Date of Patent: May 23, 2006

(54) DECENTRALIZED MANAGEMENT OF COMPOSITE DIGITAL SERVICES

(75) Inventors: Akhil Sahai, Cupertino, CA (US); Sekhar Sarukkai, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 868 days.

(21) Appl. No.: 09/651,519

(22) Filed: Aug. 30, 2000

(51) Int. Cl.
*G06F 15/16* (2006.01)
*G06F 15/173* (2006.01)

(52) U.S. Cl. ............... 709/223; 709/201; 709/218; 709/243

(58) Field of Classification Search ........... 709/213, 709/223, 224, 226, 227, 229, 230, 318; 370/401
See application file for complete search history.

(56) References Cited

U.S. PATENT DOCUMENTS

| | | | |
|---|---|---|---|
| 5,751,962 A * | 5/1998 | Fanshier et al. | 709/316 |
| 5,832,224 A * | 11/1998 | Fehskens et al. | 709/223 |
| 5,999,978 A * | 12/1999 | Angal et al. | 709/229 |
| 6,064,656 A * | 5/2000 | Angal et al. | 709/213 |
| 6,119,158 A * | 9/2000 | Kawagoe | 709/224 |
| 6,145,001 A * | 11/2000 | Scholl et al. | 709/227 |
| 6,212,511 B1 * | 4/2001 | Fisher et al. | 709/230 |
| 6,243,746 B1 * | 6/2001 | Sondur et al. | 709/224 |
| 6,427,168 B1 * | 7/2002 | McCollum | 709/224 |
| 6,430,616 B1 * | 8/2002 | Brinnand et al. | 709/224 |
| 6,459,700 B1 * | 10/2002 | Hoang | 370/401 |
| 6,532,491 B1 * | 3/2003 | Lakis et al. | 709/226 |

* cited by examiner

*Primary Examiner*—Rupal Dharia
*Assistant Examiner*—Quang N. Nguyen

(57) ABSTRACT

A system that enables decentralized management of a composite e-service by obtaining information which is useful for management of the composite e-service even when the arrangement of e-services that make up the composite e-service are dynamically changing. The system includes mechanisms for generating a set of management information for each of a set of service interactions among the e-services that currently make up the composite e-service. The system includes mechanisms for transferring the sets of management information up a tree structure of the composite e-service to an e-service in the tree structure that provides a portal to the composite e-service. The system also includes mechanisms for combining the management information at each level of the tree structure.

27 Claims, 3 Drawing Sheets

DECENTRALIZED MANAGEMENT OF COMPOSITE DIGITAL SERVICES

BACKGROUND OF THE INVENTION

1. Field of Invention

The present invention pertains to the field of digital services. More particularly, this invention relates to mechanisms that enable decentralized management of composite digital services.

2. Art Background

A wide variety of digital services may be provided to users via large-scale networks. For example, the Internet commonly provides access to numerous digital services including information services and electronic commerce (e-commerce) services. Such services may be referred to as e-services.

Typically, a user interacts with an e-service using a client-server protocol. For example, users on the Internet commonly use a web client to interact with web servers that provide e-services.

Multiple e-services may be combined in a manner that enables users to access multiple e-services through a single server which is often referred to as a portal. For example, a group of e-commerce services may implement mechanisms that enable a user to access the inventories of each member of the group through a web portal. The e-services in such a group are commonly arranged in a tree structure in which each e-service communicates with one or more sub-services in the tree. Such an arrangement of e-services may be referred to as a composite e-service.

It is often desirable to provide management functions for composite e-services. An example of a management function for a composite e-service is the monitoring of the performance of the individual e-services in the composite e-service. Other examples of management functions include, security, and accounting functions, etc, associated with the e-services in the composite e-service.

Prior systems for managing e-services are typically centralized in nature. For example, the simple network management protocol (SNMP) is commonly employed in local area networks and corporate networks, etc. A system with SNMP usually includes a central SNMP manager that communicates with a set of SNMP agents which are distributed throughout the network. Unfortunately, such a system of centralized management is usually ill-suited to the decentralized nature of composite e-services. Moreover, the arrangement of e-services in a composite e-service may change dynamically. Such centralized management systems are typically ill-suited to adapt to such a dynamically changing arrangements of e-services.

SUMMARY OF THE INVENTION

A system is disclosed that enables decentralized management of a composite e-service by obtaining information which is useful for management of the composite e-service even when the arrangement of e-services that make up the composite e-service are dynamically changing. The system includes mechanisms for generating a set of management information for each of a set of service interactions among the e-services that currently make up the composite e-service. The system includes mechanisms for transferring the sets of management information up a tree structure of the composite e-service to a e-service in the tree-structure that provides a portal to the composite e-service. The system also includes mechanisms for combining the management information at each of a set of levels of the tree structure. The management of the composite e-service is decentralized because any e-service or any client may obtain and make use of the management information rather than a predefined central manager as in prior systems.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
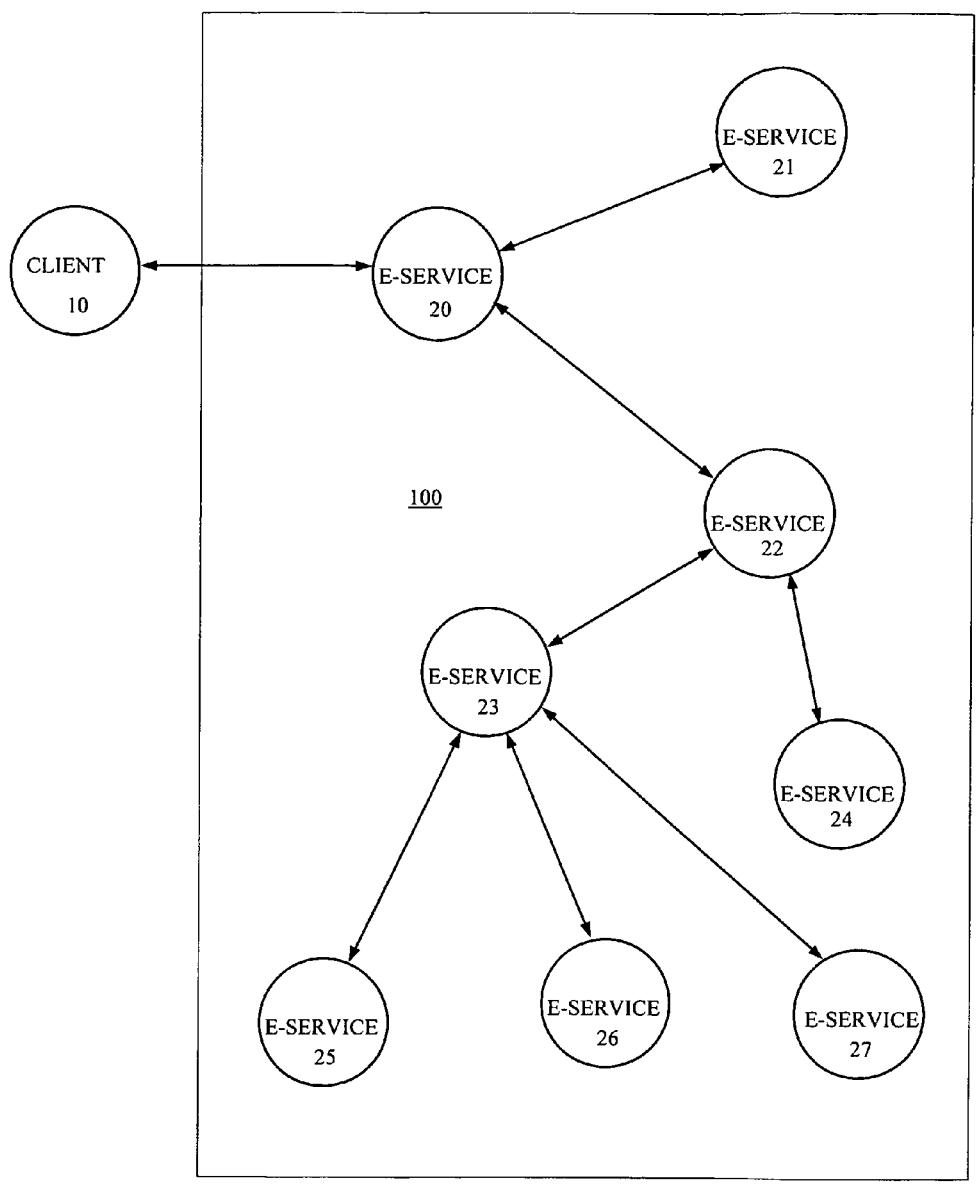
FIG. 1 shows an example of a composite e-service which is accessed by a client.

FIG. 1 shows an example of a composite e-service 100 which is accessed by a client 10. The composite e-service 100 includes a set of e-services 20–27. Each of the e-services 20–27 is an e-service which implements a boundary and interface specification that enables interactions with other communication elements. A boundary and interface specification may conform to industry standard including industry standards associated with Internet communication.

An e-service is a service which may be available via the Internet that completes tasks, solves problems, and/or conducts transactions. Virtually any asset including hardware and software and businesses processes, data, and expertise can be made available as an e-service to drive new revenue streams or create new efficiencies in the Internet economy. Examples of e-services are numerous and include on-line retail and wholesale e-services, business-to-business e-services, digital information services including news, sports, entertainment, educational, etc., on-line applications, and data service providers to name just a few examples.

The e-services 20–27 of the composite e-service 100 are arranged in a hierarchy. The e-service 20 provides the base or top level of the hierarchy and provides the client 10 with an access path or portal to the composite e-service 100. The e-services 21 and 22 are sub-services in relation to the e-service 20. Similarly, the e-services 23 and 24 are sub-services in relation to the e-service 22 and the e-services 25–27 are sub-services in relation to the e-service 23. Each sub-service defines a corresponding level of the hierarchy. The arrangement shown of the e-services 20–27 is only one example arrangement of a composite e-service and numerous others are possible including a tree composed of only two e-services.

In one embodiment, the client 10 is a world-wide-web (web) client and the e-service 20 is a web-based e-service. The client 10 and the e-service 20 communicate with one another using the Hyper Text Transfer Protocol (HTTP) of the Internet. The e-service 20 provides a web portal to the composite e-service 100.

Each sub-service in the composite e-service 100 may function as a web service for its corresponding parent e-service. For example, the e-services 21 and 22 may be implemented as web services in relation to the e-service 20. The e-service 20 may function as a web client when communicating with the e-services 21 and 22. Alternatively, the e-services 20–27 may interact with one another using another protocol—for example, the TCP of the Internet. The e-services 20–27 may implement a mixture of communication protocols for service interactions.

The e-services 20–27 collectively implement a service-to-service communication protocol which enables service interactions among the e-services 20–27. The service-to-service communication protocol enables the e-services 20–27 to formulate the tree arrangement of the composite e-service 100. For example, the service-to-service communication protocol enables the e-services 20 and 22 to formulate a composite e-service with the e-service 22 as a sub-service of the e-service 20. Similarly, the service-to-service communication protocol enables the e-services 22 and 24 to formulate a composite e-service with the e-service 24 as a sub-service of the e-service 22.

The service-to-service communication protocol implemented by the e-services 20–27 may provide for dynamic composition of e-services. For example, the service-to-service communication protocol may enable automatic negotiation and formation of composite services including bid submissions, contract generation, and digital signatures.

The service-to-service communication protocol implemented by the e-services 20–27 may be based on the exchange of XML documents among the e-services 20–27 using the HTTP protocol. One example of a service-to-service communication protocol is the ECO framework which is based on the exchange of XML documents. Another example is Biztalk which is also XML-based. Yet another example of a service-to-service communication protocol is the E-Services Service Specification of Hewlett-Packard Company.

The client 10 interacts with the composite e-service 100 using one or more service interactions. The boundaries of a service interaction are defined by a request from the client 10 and a corresponding response from the composite e-service 100. Any number of resulting service interactions may take place among the e-services 20–27 in between the request from the client 10 and the corresponding response back to the client 10. Each of the service interactions that take place among the e-services 20–27 includes a request and a corresponding response that completes/satisfies the request.

Figure 2:
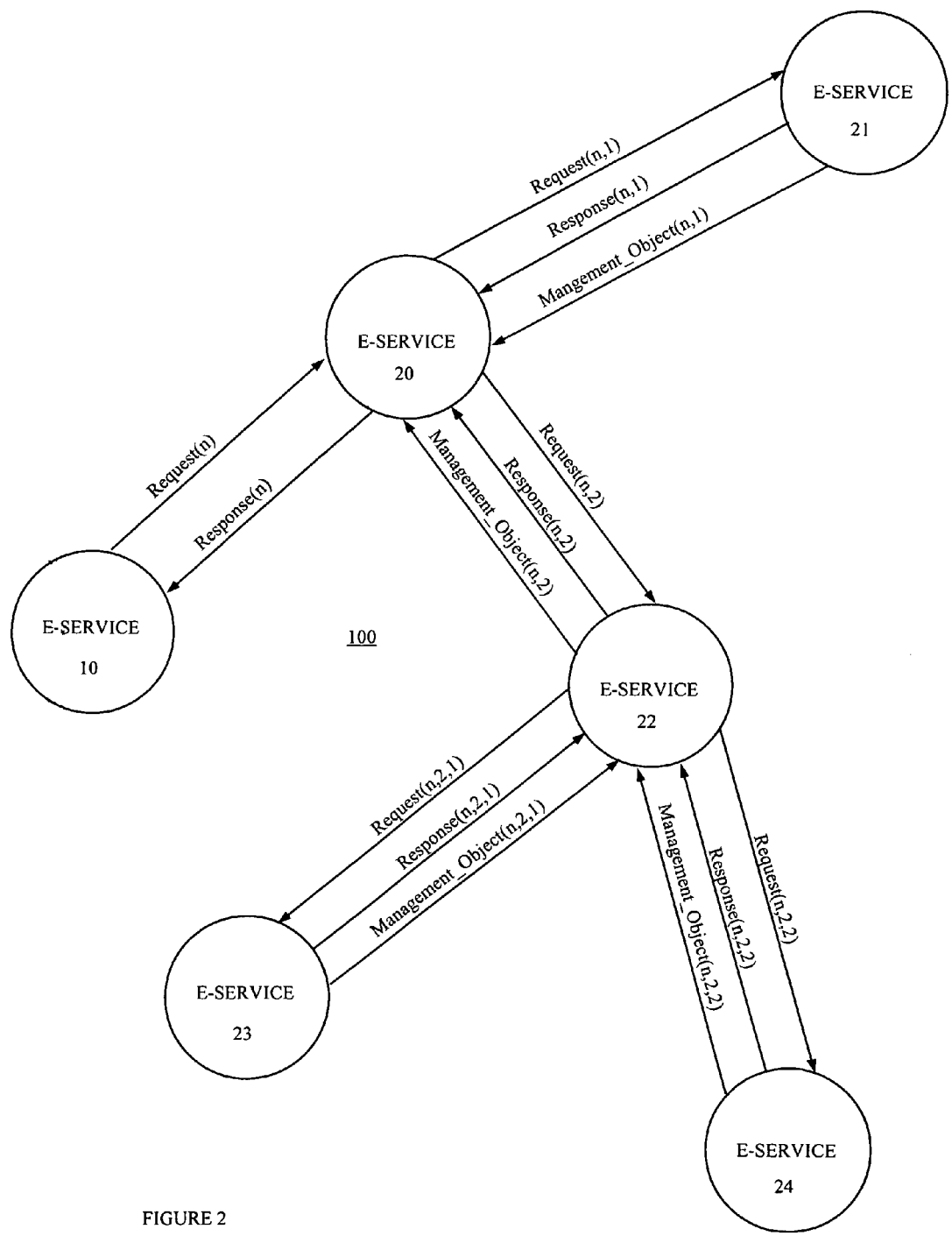
FIG. 2 shows a set of service interactions among the e-services of a composite e-service and the handling of corresponding management objects.

FIG. 2 shows the composite e-service 100 at a point in time in which it is composed only of the e-services 20–24. This point in time may be before the e-service 23 has completed the negotiation of composite e-services with the e-services 25–27.

The following focuses on an example in which the composite e-service 100 is an on-line retail e-service in which any one or more of the e-services 20–24 provide their own inventory of retail items. The techniques disclosed herein are nevertheless applicable to numerous other types of e-services.

The client 10 generates a request (request(n)) to the e-service 20. For example, the request(n) may be a request generated by the client 10 to retrieve an inventory of items available through the composite e-service 100. The variable n is used as an indicator to identify the request throughout the composite e-service 100. The value of n may be generated by the client 10 or the composite e-service 100.

The request(n) may be an HTTP GET command that specifies a uniform resource locator (URL) which corresponds to the e-service 20. Alternatively, the request(n) may be composed of multiple HTTP commands or another type or types of commands such as FTP commands, etc.

The request(n) is received by the e-service 20 which functions as a portal to the composite e-service 100. The e-service 20 handles the request(n) by generating a request (request(n,1)) to the e-service 21 and a request (request(n,2)) to the e-service 22 in accordance with the terms of the composite e-service 100. The e-service 20 may also perform its own internal operations in order to satisfy the request(n).

In the above example for the request(n), the request(n,1) may be a request generated by the e-service 20 to retrieve an inventory of items available through the e-service 21 and the request(n,2) may be a request generated by the e-service 20 to retrieve an inventory of items available through the e-service 22. This is in accordance with the service agreement previously negotiated among the e-services 20–22. The request(n,1) and the request(n,2) may be HTTP GET commands that specify URLs which correspond to the e-services 21 and 22, respectively, or may be FTP commands, etc.

The e-service 21, which currently has no sub-services in this example, handles the request(n,1) internally by generating a list of inventory items and sending the list back to the e-service 20 in a response (response(n,1)) to the request(n, 1). The e-service 21 also generates a management object (management_object(n,1)) and transfers it back to the e-service 20 after completing the request(n,1). The management_object(n,1) contains a set of management-specific information associated with the servicing of the request(n,1) by the e-service 21.

The e-service 22 handles the request(n,2) by generating a request (request(n,2,1)) to the e-service 23 and a request (request(n,2,2)) to the e-service 24 in accordance with the terms of the composite e-service 100. The e-service 22 may also perform its own internal operations in order to satisfy the request(n,2).

The e-service 23, which currently has no sub-services in this example, handles the request(n,2,1) internally by generating a list of inventory items and sending the list back to the e-service 22 in a response (response(n,2,1)) to the request(n,2,1). The e-service 23 generates a management object (management_object(n,2,1)) and transfers it back to the e-service 22 after satisfying the request(n,2,1). The management_object(n,2,1) contains a set of management-specific information associated with the servicing of the request(n,2,1) by the e-service 23.

Similarly, the e-service 24 handles the request(n,2,2) internally by generating a list of inventory items and sending the list back to the e-service 22 in a response (response(n, 2,2)). The e-service 24 generates a management object (management_object(n,2,2)) and transfers it back to the e-service 22 after satisfying the request(n,2,2). The management_object(n,2,2) contains a set of management-specific information associated with the servicing of the request(n, 2,2) by the e-service 24.

The e-service 22 receives the response(n,2,1) and the response(n,2,2) from the e-services 23 and 24, respectively, and in turn generates a response (response(n,2)) back to the e-service 20 to satisfy the request(n,2). The e-service 22 also receives the management_object(n,2,1) and the management_object(n,2,2) from the e-services 23 and 24, respectively, and combines them into a management object (management_object(n,2)). The e-service 22 may also include in the management_object(n,2) a set of management-specific information associated with its servicing of the request(n,2). The e-service 22 correlates the management_object(n,2,1) and the management_object(n,2,2) and its own internal management information using the value for the variable n. The e-service 22 transfers the management_object(n,2) back up to the e-service 20 after satisfying the request(n,2).

Likewise, the e-service 20 receives the response(n,1) and the response(n,2) from the e-services 21 and 22, respectively, and in turn generates a response (response(n)) back to the client 10 to satisfy the request(n). The e-service 20 also receives the management_object(n,1) and the management_object(n,2) from the e-services 21 and 22, respectively, and combines them into a management_object (management_object(n)). The e-service 20 may also include in the management_object(n) a set of management-specific information associated with its servicing of the request(n). The e-service 22 correlates the management_object(n,1) and the management_object(n,2) and its own internal management information using the value for the variable n.

The e-service 20 may itself act upon the information in the management_object(n) and perform management functions for the composite service 100. Alternatively, the e-service 20 transfer the management_object(n) to another e-service which performs management functions. The e-service 20 may use the information from the management_object(n) to provide further interactions with the client 10 such as billing for services, etc.

Multiple service interactions may take place at any point in the tree structure of the composite e-service 100 in between the request(n) and the response(n). For example, the e-service 20 may issue a series of m requests (request [(n,1)(1)] through request[(n,1)(m)]) to the e-service 21 and receive back a series of m responses (response[(n,1)(1)] through response[(n,1)(m)]). After each response[(n,1)(m)] the e-service 21 transfers a corresponding management_object[(n,1)(m)] back up to the e-service 20 and the e-service 20 combines them using the variable n as appropriate.

Figure 3:
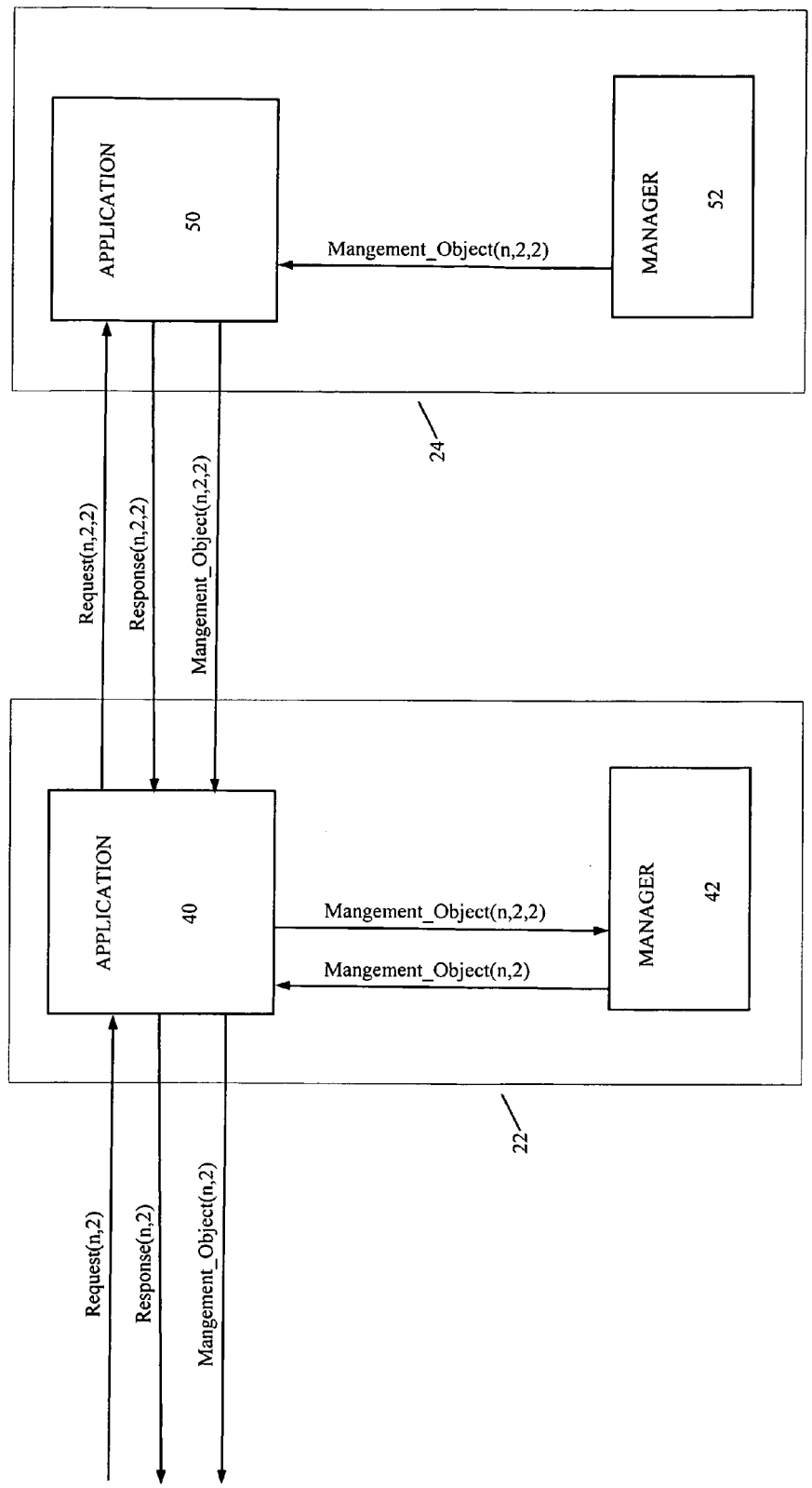
FIG. 3 shows one example implementation of the management elements of a e-service in a composite e-service.

FIG. 3 shows one example implementation of the management elements of the e-services 22 and 24. In this example, the e-services 22 and 24 each include a manager, the managers 42 and 52, respectively, that enable decentralized management of composite e-services as taught herein. The remaining of the e-services 20–27 may be implemented with managers in a similar manner.

The e-service 22 includes an application 40 that obtains the request (n,2) from the e-service 20. The application 40 handles the request (n,2) by issuing the request(n,2,2) to the e-service 24 and optionally performing its own internal operations to satisfy the request(n,2).

The manager 42 gathers a set of predefined management parameters which are associated with the servicing of the request(n,2) by the e-service 22. For example, the manager 42 may measure the amount of time taken by the application 40 to performs its internal operations in response to the request (n,2). As another example, the manager 40 may log errors that may occur in the e-service 22 during the servicing of the request (n,2). These are just a couple of examples of the management parameters that may be gathered by the manager 42 and numerous others are possible.

In a similar manner, an application 50 in the e-service 24 services the request (n,2,2) from the e-service 20 while the manager 52 gathers a set of predefined management information which is associated with the servicing of the request (n,2,2) by the e-service 24. For example, the manager 52 may measure the amount of time taken by the application 50 to service the request (n,2,2), and/or may log errors that occur in the e-service 24 during the servicing of the request (n,2,2), etc.

Upon completion of its handling of the request(n,2,2), the application 50 transfers the response(n,2,2) back up to the e-service 22. The manager 52 assembles the gathered management information associated with the servicing of the request(n,2,2) by the e-service 24 into the management_object(n,2,2) and transfer the management_object(n,2,2) to the application 50. The application 50 then relays the management_object(n,2,2) back to the e-service 22.

The application 40 receives the management_object(n,2,2) from the e-service 24 and relays it to the manager 42. Upon completion of its handling of the request(n,2) and receipt of the response(n,2,2), the application 40 transfers the response(n,2) back up to the e-service 20. The manager 42 assembles the management information associated with the servicing of the request(n,2) by the e-service 22 into the management_object(n,2). The manager 42 also uses the value of the variable n to combine the information from the management_object(n,2,2) into the management_object(n, 2). The combining of the management information may take any form such as the tallying indicators and/or the summation and/or concatenation of parameters as appropriate to name a few possibilities.

Although not shown in FIG. 3, the manager 42 additionally combines the information from the management_object (n,2,1) into the management_object(n,2). The manager 42 then transfers the management_object(n,2) to the application 40 which relays the management_object(n,2) back up to the e-service 20.

The applications 40 and 50 and the managers 42 and 52 are adapted to underlying execution environments of the e-services 22 and 24. For example, if the e-service 22 provides a Java environment then the application 40 and the manager 42 may be Java servlets. If the e-service 22 is a platform that employs a particular operating system, then the application 40 and the manager 42 may be application programs that run under the particular operating system. Communication between the applications 40 and 50 and the corresponding managers 42 and 52 may be accomplished using any known mechanism that is enabled by the underlying execution environment. The managers 42 and 52 may make use of underlying system utilities for gathering and recording management information.

The techniques disclosed herein may be implemented using any underlying execution environment or hardware/software platform for the e-services 20–27. The e-services 20–27 may be implemented on different machines or any one or more of the e-services 20–27 may be implemented on the same machine. In addition, the e-services 20–27 may be implemented using different underlying environments. For example, the e-service 22 may be implemented in a Java environment whereas the e-service 24 may be implemented in a windows environment so long as a appropriate common format for the management_objects is used.

The information gathered by the managers and assembled into management_objects may include any number and variety of parameters that are useful in management of composite e-services. Examples include the time it takes for an e-service to complete a request, indications of errors (hardware and/or software) that occurred while servicing a request, costs associated with the servicing of a request, security violations that occur during the servicing of a request, and resource usage associated with the servicing of a request, to name a few examples. Any type of format may be employed for a management object. The following is one example of a management_object which is an XML document.

```
<MANAGEMENT_OBJECT>
    <Events>
        <ITEM>
            <EVENT_TYPE>E-service Exception
            </EVENT_TYPE>
            <AT_TIME>
                34678909
            </AT_TIME>
            <MESSAGE>
            e-service1.com Unavailable
```

```
                    </MESSAGE>
                    <EVENT_TYPE>
                        E-service.Success
                    </EVENT_TYPE>
                    <MESSAGE>
                </ITEM>
                <ITEM>
                        E-service2.com
                        successfully accessed
                    </MESSAGE>
                    <AT_TIME>
                        34567804
                    </AT_TIME>
                </ITEM>
            </Events>
            <PERFORMANCE>
                <ITEM>
                    <E-service_ACCESSED_URL>
                        http: //www.e-
                        service2.com
                    </Eservice_ACCESSED_URL>
                    <ACCESS_DURATION_SECS>
                        1005
                    </ACCESS_DURATION_SECS>
                    <ACCESS_TIME_OFTHEDAY>
                        12457890
                    </ACCESS_TIME_OFTHEDAY>
                </ITEM>
            </PERFORMANCE>
            <SECURITY>
                <FIREWALL_TRAVERSAL>
                        YES
                </FIREWALL_TRAVERSAL>
                <FIREWALL_AT>
                        http://e-service2 com
                </FIREWALL_AT>
            </SECURITY>
    </MANAGEMENT_OBJECT>
```

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A method comprising:

generating a set of management information for each of service interactions among e-services in a composite e-service arranged in a tree structure including a first e-service that provides a portal to the composite e-service;

in performing the service interactions, at least the first e-service sending a first request to a second e-service at a first lower level of the tree structure, the second e-service sending a second request to a third e-service at a second lower level of the tree structure lower than the first lower level, and the third e-service sending a third request to a fourth e-service at a third lower level of the tree structure lower than the second lower level;

transferring the sets of management information up the tree structure to the first e-service; and combining the management information at the first e-service and at the e-services at the first and second lower levels of the tree structure.

2. The method of claim 1, further comprising: in performing the service interactions, at least the third e-service sending a response to the second e-service in response to the second request, and the second e-service sending a response to the first e-service in response to the first request.

3. The method of claim 1, wherein each set of management information is contained in a management object.

4. The method of claim 3, wherein the management object has the form of an XML document.

5. The method of claim 1, wherein the step of combining the management information comprises the step of combining the management information using an indicator carried in each set of management information that identifies a service interaction between a client and the portal.

6. The method of claim 1, wherein the management information includes a time taken by the corresponding e-service to complete a corresponding request.

7. The method of claim 1, wherein the management information includes an indication of errors that occurred in the corresponding e-service while servicing a corresponding request.

8. The method of claim 1, wherein the management information includes a set of costs incurred in the corresponding e-service while servicing a corresponding request.

9. The method of claim 1, wherein the management information includes an indication of security violations that occurred in the corresponding e-service while servicing a corresponding request.

10. The method of claim 1, wherein the management information includes an indication of resource usage in the corresponding e-service while servicing a corresponding request.

11. The method of claim 1, further comprising each of the first, second, and third e-services being available over a network and performing at least one of completing tasks, solving problems, and conducting transactions.

12. The method of claim 1, further comprising each of the first, second, and third e-services providing at least one of on-line electronic commerce services, on-line news services, on-line sports services, on-line entertainment services, and on-line educational services.

13. A composite e-service comprising e-services arranged in a tree structure including a first e-service that provides a portal to the composite e-service, each e-service having a manager such that the managers generate a set of management information for each of service interactions among the e-services and transfer the sets of management information up the tree structure to the first e-service, wherein to perform the service interactions, the first e-service sends requests to e-services at a first lower level of the tree structure, the e-services at the first lower level sends requests to e-services at a second lower level in the tree structure lower than the first lower level, and the e-services at the second lower level sends requests to e-services at a third lower level of the tree structure lower than the second lower level, wherein the first e-service, and e-services at the first and second lower levels are each adapted to combine the management information received from e-services at respective lower levels of the tree structure.

14. The composite e-service of claim 13, wherein each e-service includes an application that processes the corresponding service interaction while the corresponding manager gathers the corresponding management information.

15. The composite e-service of claim 13, wherein the managers assemble the management information into a set of management objects.

16. The composite e-service of claim 15, wherein each management object has the form of an XML document.

17. The composite e-service of claim 13, wherein the managers combine the management information using an indicator carried in each set of management information that identifies a service interaction between a client and the portal.

18. The composite e-service of claim 13, wherein the management information includes a time taken by the corresponding e-service to complete a corresponding request.

19. The composite e-service of claim 13, wherein the management information includes an indication of errors that occurred in the corresponding e-service while servicing a corresponding request.

20. The composite e-service of claim 13, wherein the management information includes a set of costs incurred in the corresponding e-service while servicing a corresponding request.

21. The composite e-service of claim 13, wherein the management information includes an indication of security violations that occurred in the corresponding e-service while servicing a corresponding request.

22. The composite e-service of claim 13, wherein the management information includes an indication of resource usage in the corresponding e-service while servicing a corresponding request.

23. The composite e-service of claim 13, wherein each of the first e-service and e-services at the first, second, and third lower levels provides at least one of on-line electronic commerce services, on-line news services, on-line sports services, on-line entertainment services, and on-line educational services.

24. A system comprising:
a plurality of modules to provide a set of digital services arranged in at least four levels of a tree structure, the digital services comprising at least one of on-line electronic commerce services, on-line news services, on-line sports services, on-line entertainment services, and on-line educational services;
the modules to communicate to enable the digital services to interact,
the modules to generate sets of management information as a result of the interacting of the digital services,
the modules to transfer the sets of management information up the tree structure and to combine the management information at each module at least at three of the four levels as the management information is transferred up the tree structure.

25. The system of claim 24, wherein a first one of the digital services is a portal to the set of the digital services.

26. The system of claim 25, wherein a first one of the modules associated with the first digital service is adapted to send one or more requests to one or more modules associated with digital services at a first lower level of the tree structure, the one or more modules associated with digital services at the first lower level to send one or more requests to one or more modules associated with digital services at a level in the tree structure lower than the first lower level.

27. The system of claim 26, wherein the one or more modules associated with digital services at the level lower than the first lower level are adapted to send one or more responses to the one or more modules associated with digital services at the first lower level, and the one or more modules associated with digital services at the first lower level to send one or more responses to the first module.

* * * * *